United States Patent Office 3,413,127
Patented Nov. 26, 1968

3,413,127
METHOD OF PREPARING A POULTRY PRODUCT
Donald V. Schwall, Glen Ellyn, and Alan B. Rogers, Palos Park, Ill., assignors to Armour and Company, Chicago, Ill., a corporation of Delaware
No Drawing. Continuation-in-part of application Ser. No. 354,118, Mar. 23, 1964. This application Aug. 29, 1966, Ser. No. 575,541
6 Claims. (Cl. 99—107)

ABSTRACT OF THE DISCLOSURE

A combination of sodium chloride and edible phosphate salt is applied to the surface of raw pieces of poultry, the pieces are agitated for a period of time until the concentration of salt-soluble protein is formed on the surfaces thereof, and the pieces are then pressed together to form a unitary body characterized by its improved resistance to water cook-out and its retention of intact slicability after cutting. It has been found that in the combination incorporaing the sodium chloride and phosphate salts, the flavor characteristics of the two components are non-additive, whereas the binding characteristics are infact additive, as a result of which it is possible to use a high total salt concentration to obtain the desired binding effect without imparting a noticeable sodium chloride or phosphate taste.

---

This is a continuation-in-part of application Ser. No. 354,118, filed Mar. 23, 1964, now Patent No. 3,285,753, issued Nov. 15, 1966.

The present invention relates to an improved method of preparing a shaped poultry product made up of a plurality of smaller pieces or chunks of poultry meat which are packed together in log, roll, roast or other form, and which can be cooked with relatively little cook-out of natural juices and can be sliced without falling apart. The method of the present invention is directed specifically to the use of a combiantion of additives effective in producing an enhanced binding effect without impairment of flavor.

Usual commercial manufacturing procedures for heat-processed meats in cans, logs, or rolls result in considerable losses in water cook-out, which may amount to about 15–30% of the original weight of the poultry meat, varying with the heat treatment employed. Gelatin, wheat gluten, or other material are sometimes added to the formulation in an effort to hold this water and to hold the meat pieces together. However, the results of such measures leave much to be desired. The poultry meat mass is not continuous and contains gel pockets and layers between the individual meat pieces. The gels not only fail to effectively hold the mass together but are also undesirable from an aesthetic point of view. Moreover, the product usually lacks desired moistness and tenderness.

In copending application Ser. No. 352,325, filed Mar. 16, 1964, now Patent No. 3,285,752, issued Nov. 15, 1966, there is described and claimed the preparation of an improved poultry product which can be cooked with relatively little cook-out of natural juices and which can be sliced into continuous pieces which do not fall apart. Stated in general terms, the process described in said copending application comprises the steps of applying edible metallic salt, such as sodium chloride, to the surfaces of pieces or chunks of poultry meat, agitating or tumbling the said pieces or chunks until a concentration of salt soluble protein is formed on the surfaces thereof, pressing the pieces together, and then cooking. The agitation or tumbling of the poultry pieces in the presence of the salt causes salt soluble proteins, such as myosin, to migrate to the surface of each piece and to concentrate there in the form of a creamy, sticky coating. When the pieces are pressed together in a container, this coating has an adhesive effect and binds the pieces together in a cohesive mass. This effect is very much more pronounced after the product has been cooked, and in fact the pressed and cooked product is extremely similar in appearance, texture and sliceability to a single large piece of poultry meat. The process of said copending application is particularly applicable to poultry meat which has passed through rigor mortis, or, in other words, has passed through the holding or aging period which is required in commercial operations to remove body heat and effect the aging necessary for tenderness in cooking. In copending application Ser. No. 354,118, there is described an improvement in which poultry skin is added to the mixture to enhance the flavor and aroma of the product without impairing its adhesiveness.

The present invention is based in part on the discovery that the procedures set forth in said copending applications Ser. No. 352,325 and Ser. No. 354,118 can be substantially improved by utilizing a combination of sodium chloride and an edible phosphate salt, rather than a single salt component, as disclosed in said application. It has been found that in cases where a high degree of binding is desired but where the higher salt concentrations necessary for such binding would impart too strong a salt flavor to the poultry product, this difficulty can be overcome by utilizing part sodium chloride and part edible phosphate to make up the total salt effect. It has been found that in a combination incorporating substantial portions of sodium chloride and phosphate salts, the flavor characteristics of the two components are non-additive whereas the binding characteristics are in fact additive, as a result of which it is possible to use a high total salt concentration to obtain the desired binding effect without imparting a noticeable sodium chloride or phosphate taste.

In its preferred embodiment, therefore, the process of the present invention comprises the steps of slaughtering and dressing poultry, applying to the surface of raw pieces of said poultry from 0.1 to 2.0% of sodium chloride based on the weight of said poultry pieces and from 0.02 to 0.8% of an edible phosphate salt, agitating said pieces for a period of time until a concentration of salt soluble protein is formed on the surface thereof, and pressing the pieces together to form a unitary body characterized by its improved resistance to water cook-out and its retention of intact sliceability after cooking.

This invention is applicable generally to any type of poultry which is regularly slaughtered, processed and sold for its meat. The term poultry includes turkeys, such as toms, hens, breeders, broilers, fryers, and roasting turkeys; chickens, such as hens, roosters, broilers, fryers, and roasting chickens; ducks; geese; and the like. The invention applies to the white and dark meat of poultry, as well as mixtures thereof, and it applies to poultry of any age, although the younger ages are preferred. The benefits of the invention are not generally obtained with cured poultry products—i.e. products which have been treated with effective amounts of nitrites—and therefore poultry products which have been cured, in the ordinary sense of the word, are not included in the scope of the invention.

In preparing the poultry for use in the process, certain precautions must be observed. It is preferred that slush ice chilled poultry, brought down to a temperature below 40° F., be used. If instead it is desired to use poultry which has been frozen immediately following slaughter, it is preferred that the frozen bird be thawed in refrigerated air not exceeding 40° F., or in running water not exceeding 50° F., before using as raw material in the process. In either case, the prepared bird is boned in the normal manner, at temperatures preferably below 50° F., and the boned raw pieces and chunks used as starting material in the process. The white and dark meat may be collected separately and used in the process separately if an all-white or all-dark end product is desired, or they may be combined in suitable proportions if a combination end product is desired. The smaller scraps and trimmings and the skin are preferred to be collected separately and used in the process in the manner specifically described hereinafter.

The phosphate salt to be alllied, in combination with the sodium chloride, to the surfaces of the poultry meat pieces or chunks, may be any edible phosphate salt which can combine with the natural moisture and the protein of the meat to result in a film of salt soluble protein on the surface thereof. Generally speaking, the phosphate salts may be of any of the molecularly dehydrated sodium or potassium phosphates having the general formula $M_2O \cdot P_2O_5$ in which M is an alkali metal, particularly potassium or sodium, and in which the molar ratio of $M_2O$ to $P_2O_5$ is in the range of about 1:1 to about 2:1. Specific examples of phosphate salts which may be used in the invention are sodium tripolyphosphate ($Na_5P_3O_{10}$), sodium hexametaphosphate ($NaPO_3)_6$, tetrasodium pyrophosphate ($Na_4P_2O_7$), tetrapotassium pyrophosphate ($K_4P_2O_7$), potassium tripolyphosphate ($K_5P_3O_{10}$), and mixtures thereof.

It is preferred to use sodium chloride concentrations in the range of 0.1 to 2.0% based on the weight of the poultry meat, and to use phosphate concentrations in the range of 0.02 to 0.8%. Ordinarily, the ratio of sodium chloride to phosphate should be in the range of about 1:1 to about 10:1, with a preferred ratio being about 3:1. It is not necessary that the sodium chloride and phosphate be mixed together before applying to the surfaces of the poultry pieces. Suitable results are obtained if they are applied either in a mixture or separately, and in fact it is within the scope of the invention to apply the phosphate and salt at different stages of the poultry processing, prior to the agitation step. For example, the phosphate may be applied to the while poultry carcasses while soaking in chilled water, prior to boning, and the sodium chloride applied to the cut-up pieces immediately prior to the agitation step. However, the preferred practice is to spread both the sodium chloride and the phosphate in dry form over the pieces of poultry meat prior to the agitation thereof.

After the salt and phosphate have been applied to the poultry pieces or chunks, the poultry is subjected to a mixing step. The mixture is agitated or tumbled for a short period of time until a concentration of salt-soluble protein is formed at the surface of each piece. Any type of mixing, tumbling, or working action which manipulates or rubs the salt onto or into the raw poultry meat surface is suitable. For example, the salted poultry meat may be suitably agitated in a meat mixer of known type, although other obvious means of agitaiton such as churns, pumps, and the like may also be employed.

The temperature during the mixing step is preferably held below about 35° F. Temperatures as high as 70° F. have been shown to give some effect, but by far the most efficient extraction of salt soluble protein takes place at temperatures between about 25 and 35° F. Optimum temperatures are 28–30° F. The mixing is continued until each piece or chunk has become soft and pliable and is covered with a creamy coating of extracted salt soluble protein. The mixing time can be as low as 5 minutes but is usually in the neighborhood of 15 to 20 minutes, with dark meat requiring a somewhat longer time than the white meat. Agitating the meat under a vacuum or under reduced air pressure has been found beneficial in eliminating "air holes" from the final product. During the mixing step, other additives, such as sugar and spices in low concentrations, may be included without impairing the process.

After completion of the mixing procedure the poultry meat may be pressed together in containers such as casings or cans to provide conventional forms of processed poultry meat such as rolls, logs, roasts, and the like. For example, the meat from the mixing step may be placed in the mold of a conventional type sausage stuffing machine and stuffed into regular casings under pressure; or it may be pressed into cans or into cooking forms or other type pans for further processing. In any case it is desirable that pressure of some kind be applied to press the pieces of meat together and allow the adhesive nature of the salt soluble protein coating to work for the formation of a cohesive mass.

The packed product is then cooked according to conventional practices, or it may be shipped or stored in raw form for cooking at a later time. It is not necessary for the purposes of the present specification to describe in detail the conditions and techniques for the cooking step, since these are merely the usual practices of the industry. Generally speaking, and taking turkey rolls as an example, the product is cooked in cooking tanks to a final temperature in the range of 160–180° F. over a period of time amounting to about 30 minutes per pound of product.

The cooking step is effective in enhancing the binding properties of the salt soluble protein and in blending the leaves or veins of protein into the meat pieces themselves so that the end product has the appearance and behavior of a unitary cohesive mass with the interleaved veins of protein barely discernible. Although the veins or striations caused by the salt solution protein are very similar in color, strength, and behavior to the main body of meat, and appear to blend thereinto, their presence nevertheless has a very significant effect, and the resulting cooked product is more juicy and tender.

In a further embodiment of the invention, it has been found that an improved product can be made by separately mixing poultry trimmings, scraps, skin, salt and phosphate to form a paste or comminuted batter, and then adding this paste or batter to the salted and phosphated raw poultry pieces or chunks while the latter are being agitated in the mixer in the main part of the process. It has been found that the skin provides enhanced flavor and aroma to the end product and does not impair the operability of the process. In fact, the paste or batter made from treated skin, trimmings, and scrap is found to enhance the flavor and appearance of the end product. In forming the paste or batter, it is preferred to observe the same conditions with respect to salt and phosphate concentration, temperatures, and the like, as are used in preparing the mixture of poultry pieces in the main part of the process. That is, it is preferred to add salt in concentrations within the range from 0.8–1.5% and phosphate in concentrations of from .2 to .5% and to work at temperatures starting at 25–35° F. and not exceeding 70–75° F. It is important that the paste or batter not be added into the main process until after the raw poultry pieces or chunks have been treated with salt and phosphate and mixed for a period of time. Otherwise, the batter forms a coating on each piece or chunk of meat and inhibits or prevents the salt and phosphate from coming in contact with the meat surfaces and therefore substantially reduces the protein extraction effect. It is preferred to agitate the treated raw poultry pieces or chunks for a period of at least 4 or 5 minutes before adding the batter, and to incorporate the paste in a proportion within the range of 10 to 35% of paste based on the total weight of the mixture.

The batter or paste described above may also include a portion of cooked poultry meat. In the boning operation, it is sometimes desired to cut the meat roughly from the bone and then cook the bones to achieve a readier separation of the more closely adhering pieces of meat from the bones. These cooked scraps or pieces may be used in the above described batter to contribute their nutritive value without detracting from the adhesiveness of the end product. It is possible to incorporate the cooked poultry meat in quantities amounting to as much as 50% by weight of the batter. The amount of cooked poultry meat thus added should be kept below about 8% of the total weight of the poultry product to which the batter is added.

Specific examples illustrative of the invention are set out as follows:

EXAMPLE I

Turkeys were slaughtered, dressed, and slush ice chilled to a temperature of 35° F. and held overnight. The chilled turkeys were then boned, keeping the temperature of the meat below 50° F. during the entire procedure. In the boning operation, the breast meat was carefully removed by hand-boning and kept in a separate container. Dark meat was also removed from the thigh portion of the leg only and was also kept in a separate container.

10 pounds of raw, boneless white turkey meat obtained in this manner were placed in thin layers on clean trays and chilled in a freezer until the temperature of the meat was brought down to 28–30° F. The 10 pounds of white meat were then placed in a vacuum mixer, which was prechilled with ice, and .1 pound of sodium chloride (1%) and .05 pound of anhydrous sodium tripolyphosphate (.5%) were sprinkled evenly over the surface of the meat. The mixer was operated for a period of 15 minutes during which time the white meat became soft and pliable and covered with a creamy, sticky coating. The meat was taken from the mixer and placed in fibrous casings and roasted in an oven at about 190° F. for a period of time corresponding to 25 minutes for each pound of product weight.

Another 10 pounds of the same raw, boneless white turkey meat was treated in exactly the same way, except that .15 pound (1.5%) sodium chloride was used and the phosphate was omitted.

After roasting, the two batches of product were sliced and evaluated. The product containing the phosphate had less of a salty flavor but at the same time exhibited the same superior binding properties as the product containing no phosphate but a higher sodium chloride content.

EXAMPLE II 10 pounds of raw, boneless white turkey meat, obtained as in Example I, were brought to a temperature of 28–30° F. and placed in a prechilled vacuum mixer. .15 pound (1.5%) of sodium chloride and .08 (.8%) of sodium tripolyphosphate were added to the meat in dry form, and the mixer was operated for 10 minutes, during which time the meat became soft and pliable and covered with a creamy, sticky coating.

The meat was taken from the mixer and placed in the mold of a sausage stuffing machine, and stuffed into a Visking No. 8 MP casing, clipped at each end with metal clips. The roll was placed in a cooking tank in a vertical position and cooked for 5½ hours to a final internal meat temperature of 166° F., and was then cooled.

The resulting cooked product was sliced and evaluated and found to be very securely bound together into a unitary body of white turkey meat. The flavor was acceptable, even though a total salt (sodium chloride plus phosphate) concentration of 2.3% was incorporated in the product. If 2.3% sodium chloride alone or 2.3% sodium tripolyphosphate alone had been incorporated, the product would have been unacceptable as being either too salty or as having too strong a phosphate taste.

EXAMPLE III

Raw material preparation

Turkeys were slaughtered, dressed, slush ice chilled to a temperature of 35° F., and boned. In the boning operation, the breast meat was carefully removed by hand-boning, care being taken to remove all skin, excess fat, bruises, dark spots, blood clots, pin feathers, gristle, and tendons, and the skin being placed in a separate container. Dark meat was removed carefully from the thigh portion of the leg only, observing the same precautions as in the case of breast meat. "Wing knobs" were removed and placed in a separate container.

Raw meat chilling 756 pounds of boned white meat were placed in thin layers on clean trays in a freezer for about 1 hour to bring the temperature down to 28–30° F.

Batter preparation 62 pounds of boneless scrap white meat and 62 pounds of skin were placed in a silent cutter, along with 2 pounds of a salt and spice mixture containing 50% sodium chloride, 31.4% brown sugar, 14.7% sodium tripolyphosphate, 2.6% tetrasodium pyrophosphate, and 1.3% pepper, and the mixture was chopped for 5 minutes. The chopped batter was rapidly chilled to 35° F.

Mixing

The 756 pounds of white meat were placed in an Anco Vacuum Mixer which had been pre-chilled with ice, and 2 pounds 3 ounces of the same salt and spice mixture previously added to the skin batter were sprinkled evenly over the surface of the meat. The mixer was operated for 5 minutes, and then 122 pounds of the batter were added and the mixing continued for an additional 15 minutes. During the mixing operation, a vacuum of 22 in. was maintained in order to prevent air holes in the end product.

The mixture was then taken from the mixer and placed in aluminum containers and roasted as in Example I. The roasted flavor and the slicing characteristics were excellent.

EXAMPLE IV

Broiler chickens were slaughtered, dressed, and slush ice chilled to a temperature of 35° F. according to conventional poultry processing procedures. The chilled broilers were then boned to collect dark and white meat in chunks and pieces.

300 pounds of boned, raw white meat thus obtained and 200 pounds of boned, raw dark meat were spread in thin layers on clean trays in a freezer for approximately 1 hour to bring the temperature down to 28–30° F., and the chilled meat was then placed in a pre-chilled Anco Vacuum Mixer and covered evenly with ½ pound edible grade sodium hexametaphosphate and 6 pounds sodium chloride. The mixture was agitated for a period of 20 minutes, at the end of which time the pieces of chicken had become soft and pliable and covered with a layer of creamy, sticky material.

The treated mixture of white and dark chicken meat was then stuffed into perforated casings and roasted in an oven at about 190° F. for a period of time corresponding to 25 minutes for each pound of product weight. The chicken roasts prepared in this manner had an excellent flavor and displayed intact sliceability to a very desirable degree.

While in the foregoing specification this invention has been described in relation to preferred embodiments thereof, and many details have been set forth for the purpose of illustration, it will be apparent to those skilled in the art that many of the details set forth herein can be varied considerably without departing from the basic principles of the invention.

What is claimed is:

1. A method of preparing a poultry product comprising the steps of slaghtering, dressing, and aging poultry, applying to the surface of raw, uncured pieces of said poultry from .1 to 2.0% of sodium chloride based on the weight of said poultry pieces and from 0.2 to 0.8% of an edible phosphate salt, agitating said pieces at a temperature within the range of 25 to 70° F. until a concentration of salt soluble protein is formed on the surface thereof, and pressing said pieces together to form a unitary body characterized by its improved resistance to water cook-out and its retention of intact sliceability after cooking.

2. A method as set forth in claim 1 wherein the edible phosphate salt is sodium tripolyphoshate.

3. A method as set forth in claim 1 wherein the edible phosphate salt is sodium hexametaphosphate.

4. A method as set forth in claim 1 wherein the edible phosphate salt is tetrasodium pyrophosphate.

5. A method as set forth in claim 1 wherein the sodium chloride and edible phosphate are spread in dry form over the said poultry pieces prior to agitation thereof.

6. A method of preparing a poultry product, comprising the steps of slaughtering, dressing, and aging poultry, skinning and boning said poultry, applying sodium chloride and an edible phosphate salt to the surfaces of raw, uncured pieces of said boned poultry, said sodium chloride being applied in a concentration of about 0.1 to 2.0% and said edible phosphate salt being applied in a concentration of about 0.02 to 0.8% based on the final weight of the product, agitating said pieces at a temperature within the range of 25 to 70° F. until a concentration of salt-soluble protein is formed on the surfaces thereof, thereafter mixing into said coated pieces a paste prepared by grinding poultry skin and small poultry pieces, said paste being incorporated in a proportion within the range of 10 to 35% of paste based on the total weight of the mixture, further agitating the mixture, and pressing said mixture together to form a unitary body characterized by its improved resistance to water cook-out and its retention of intact sliceability after cooking.

References Cited

UNITED STATES PATENTS

| | | | |
|---|---|---|---|
| 3,024,113 | 3/1962 | Torr | 99—107 |
| 3,049,428 | 8/1962 | Hopkins et al. | 99—107 X |
| 3,076,713 | 2/1963 | Maas | 99—107 |

HYMAN LORD, *Primary Examiner.*